US011229158B1

(12) United States Patent
Janelle et al.

(10) Patent No.: US 11,229,158 B1
(45) Date of Patent: Jan. 25, 2022

(54) AIR DISTRIBUTOR DIVERTER VALVE

(71) Applicant: Deere & Company, Moline, IL (US)

(72) Inventors: Luc Janelle, Ankeny, IA (US); David L. Steinlage, Ankeny, IA (US); Ean M. Bush, East Moline, IL (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 16/933,232

(22) Filed: Jul. 20, 2020

(51) Int. Cl.
| | | |
|---|---|---|
| *B65G 53/52* | (2006.01) | |
| *A01C 15/00* | (2006.01) | |
| *A01C 15/04* | (2006.01) | |
| *B65G 53/04* | (2006.01) | |
| *F16K 11/07* | (2006.01) | |
| *F16K 31/60* | (2006.01) | |
| *B65G 53/46* | (2006.01) | |
| *B65G 53/36* | (2006.01) | |

(52) U.S. Cl.
CPC .......... *A01C 15/003* (2013.01); *A01C 15/006* (2013.01); *A01C 15/04* (2013.01); *B65G 53/04* (2013.01); *B65G 53/46* (2013.01); *F16K 11/07* (2013.01); *F16K 31/60* (2013.01); *B65G 53/36* (2013.01); *B65G 2812/1625* (2013.01)

(58) Field of Classification Search
CPC ........ B65G 53/04; B65G 53/14; B65G 53/46; B65G 53/528; B65G 53/56; B65G 2201/04; B65G 2201/042; B65G 2812/1625; B65G 2812/1633; A01C 7/081; A01C 7/082; A01C 7/084; A01C 7/06; A01C 7/085; F16K 11/0716; Y10T 137/87804

USPC ... 406/2, 127, 144, 155, 158, 181, 182, 197; 111/174, 175; 137/625.17
See application file for complete search history.

(56) References Cited

U.S. PATENT DOCUMENTS

| | | | | |
|---|---|---|---|---|
| 4,619,562 A | * | 10/1986 | Brannstrom | ............... F23J 3/06 406/182 |
| 4,669,505 A | * | 6/1987 | Nelson | ................... B65G 53/56 137/874 |
| 4,796,656 A | * | 1/1989 | Phillips | ............... F16K 11/0716 137/106 |
| 4,952,100 A | * | 8/1990 | Heep | ...................... B65G 53/56 406/182 |

(Continued)

OTHER PUBLICATIONS

Bednar Farm Machinery; Bednar Omega OO_FL Quality Crop Establishment in Any Conditions; 10 pages.

(Continued)

*Primary Examiner* — Joseph A Dillon, Jr.
(74) *Attorney, Agent, or Firm* — Taft Stettinius & Hollister LLP; Stephen F. Rost (57) ABSTRACT

An exemplary diverter valve generally includes a shell, a pipe, and a handle. The shell includes a body extending in a longitudinal direction, a shell inlet port, a shell outlet port, and a positioning slot formed in the body. The pipe is seated in the body for sliding movement in the longitudinal direction, and includes a first passage and a second passage. The handle is connected to the pipe through the positioning slot, and is operable to move the pipe relative to the shell between a first position in which the shell inlet port is connected with the shell outlet port via the first passage, and a second position in which the second passage is connected with the shell inlet port and the shell outlet port is disconnected from the second passage.

21 Claims, 7 Drawing Sheets

(56) References Cited

U.S. PATENT DOCUMENTS

| | | | |
|---|---|---|---|
| 8,408,478 | B2 | 4/2013 | Wonderlich |
| 9,615,505 | B2 | 4/2017 | Bent et al. |
| 10,058,021 | B2 | 8/2018 | Barsi et al. |
| 10,492,359 | B2 | 12/2019 | Borkgren et al. |
| 2007/0181048 | A1* | 8/2007 | Pleyer .................. A01C 7/082 111/175 |
| 2010/0122649 | A1* | 5/2010 | Memory ............... A01C 7/081 111/174 |
| 2012/0174843 | A1* | 7/2012 | Friggstad ................ A01C 7/20 111/174 |
| 2017/0156258 | A1* | 6/2017 | Reich ..................... H04L 67/12 |
| 2018/0077856 | A1* | 3/2018 | Rice ...................... A01B 49/06 |
| 2018/0317379 | A1* | 11/2018 | Pirkenseer ............ A01C 7/084 |
| 2020/0130003 | A1* | 4/2020 | Hudepohl ............. B05B 12/004 |
| 2021/0053774 | A1* | 2/2021 | Trushin ................. A01C 7/042 |

OTHER PUBLICATIONS

Pottinger; Trailed Mulch Seed Drills TERRASEM; 60 pages.
Bednar Omega OO_FL Seed Drill; https://www.bednar.com/en/o,ega-oo_fl/; 3 pages.
Horsch; Pronto DC; 3 pages; https://www.horsch.com/us/products/planting-and-seeding/disk-type-seeders/pronto-dc.

\* cited by examiner

AIR DISTRIBUTOR DIVERTER VALVE

TECHNICAL FIELD

The present disclosure generally relates to agricultural equipment, and more particularly but not exclusively relates to the distribution of agricultural products.

BACKGROUND

Air distributor systems are commonly mounted on agricultural equipment (e.g., tractors and/or trailers) to distribute agricultural products, such as seed, pesticides, and/or fertilizers. The agricultural product is typically stored in a reservoir and distributed to the distribution tower via a distribution line. One issue that can arise with such systems relates to the extraction of excess product from the reservoir. For these reasons among others, there remains a need for further improvements in this technological field.

SUMMARY

An exemplary diverter valve generally includes a shell, a pipe, and a handle. The shell includes a body extending in a longitudinal direction, a shell inlet port, a shell outlet port, and a positioning slot formed in the body. The pipe is seated in the body for sliding movement in the longitudinal direction, and includes a first passage and a second passage. The handle is connected to the pipe through the positioning slot, and is operable to move the pipe relative to the shell between a first position in which the shell inlet port is connected with the shell outlet port via the first passage, and a second position in which the second passage is connected with the shell inlet port and the shell outlet port is disconnected from the second passage. Further embodiments, forms, features, and aspects of the present application shall become apparent from the description and figures provided herewith.

DETAILED DESCRIPTION OF ILLUSTRATIVE EMBODIMENTS

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. It should further be appreciated that although reference to a "preferred" component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described.

Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Items listed in the form of "A, B, and/or C" can also mean (A); (B); (C); (A and B); (B and C); (A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

In the drawings, some structural or method features may be shown in certain specific arrangements and/or orderings. However, it should be appreciated that such specific arrangements and/or orderings may not necessarily be required. Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, may be omitted or may be combined with other features.

Figure 1:
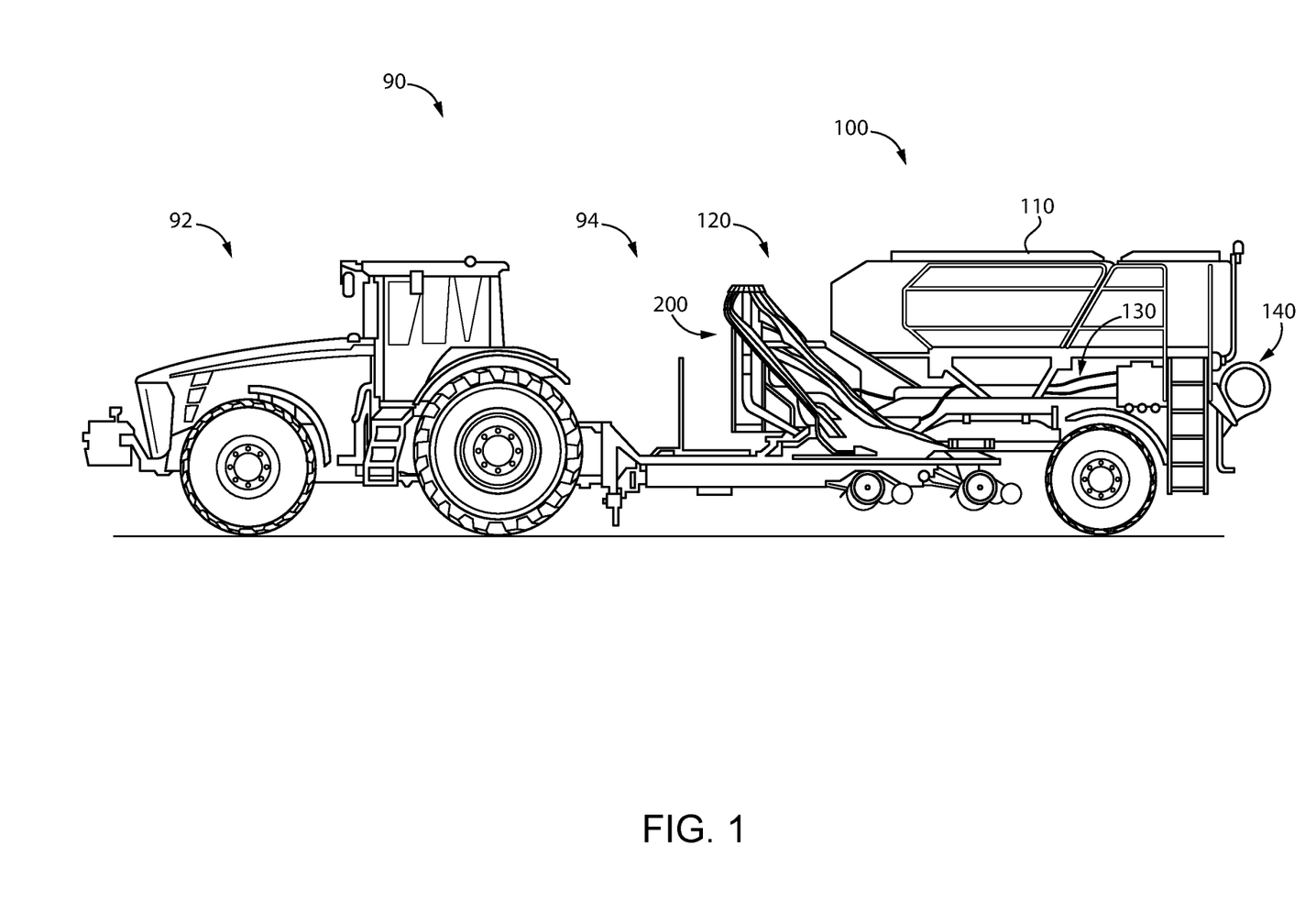
FIG. 1 illustrates agricultural equipment including an air distribution system according to certain embodiments.
Figure 2:
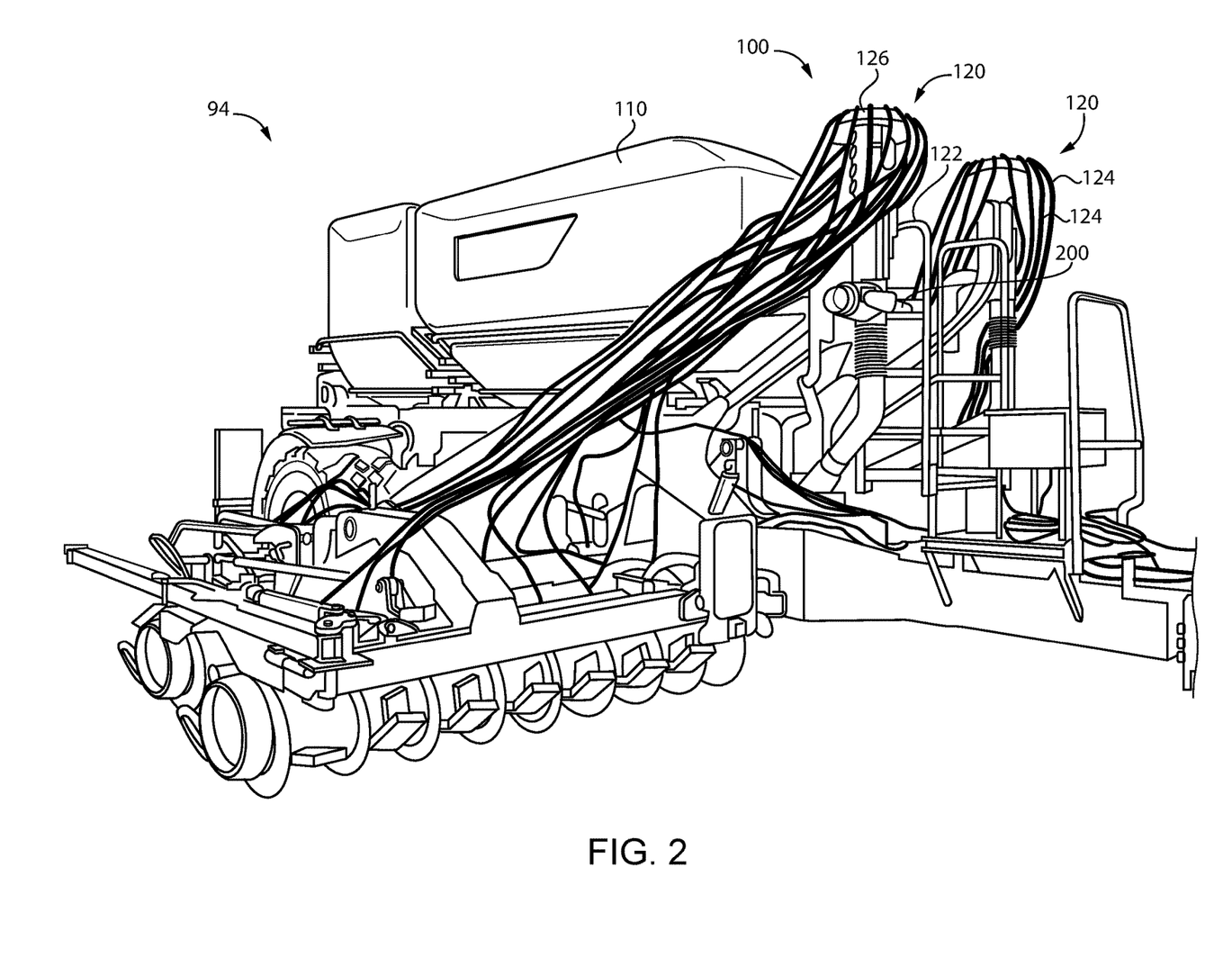
FIG. 2 illustrates the air distribution system mounted to a trailer of the agricultural equipment.

With reference to FIGS. 1 and 2, illustrated therein is agricultural equipment 90 including an air distribution system 100 according to certain embodiments. The agricultural equipment 90 generally includes a tractor 92 and a trailer 94 coupled with the tractor 92 such that the tractor 92 is operable to tow the trailer 94 across and through a plot of land. In the illustrated form, the air distribution system 100 is mounted to the trailer 94. It is also contemplated that at least a portion of the air distribution system 100 may be mounted to the tractor 92.

Figure 3:
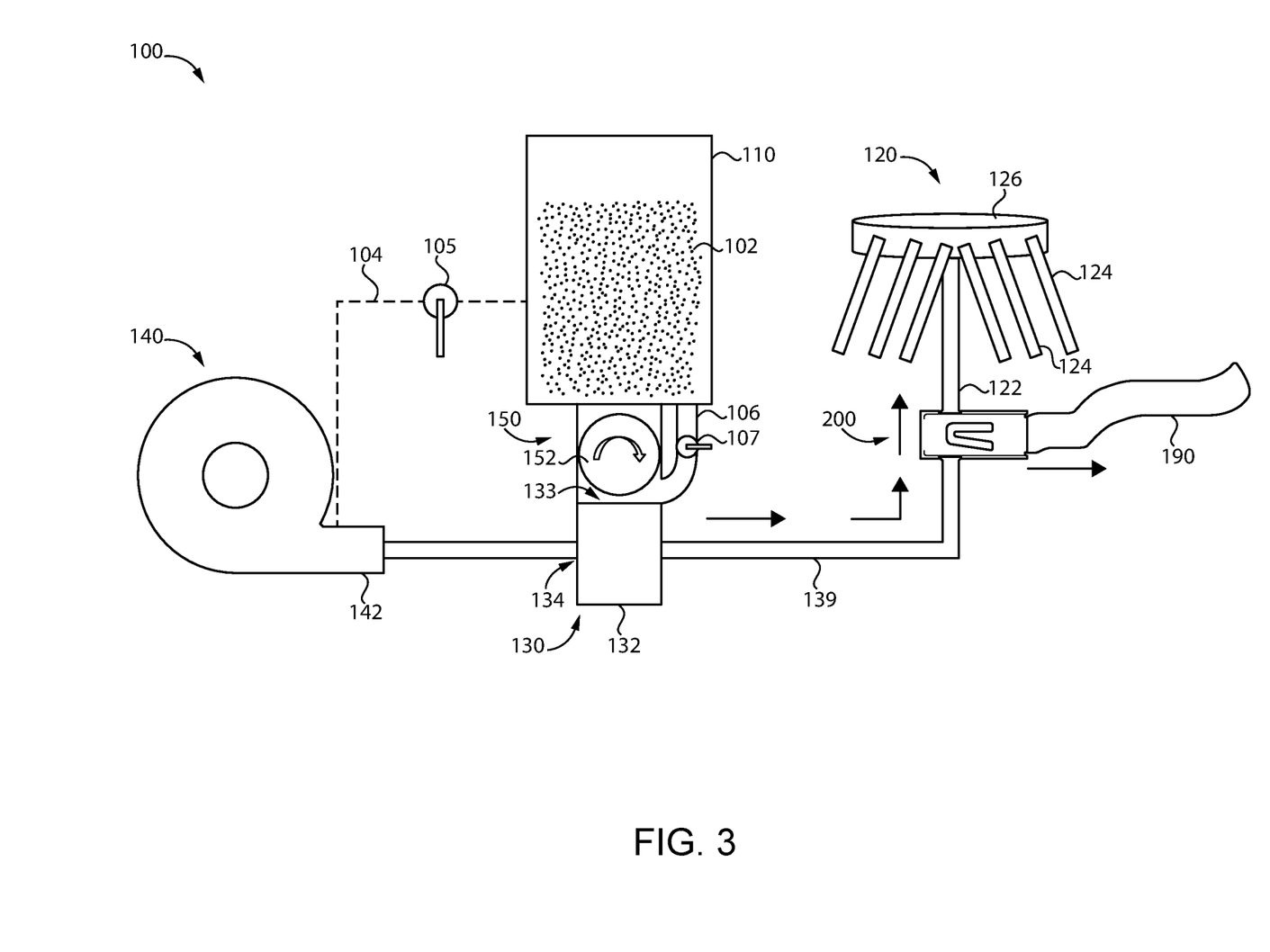
FIG. 3 is a schematic illustration of an air distribution system including a diverter valve according to certain embodiments.

With additional reference to FIG. 3, the air distribution system 100 generally includes a reservoir 110 operable to store an agricultural product 102, a distribution tower 120 operable to distribute the agricultural product 102, a distribution line 130 connecting the reservoir 110 with the distribution tower 120, and a blower 140 that facilitates movement of the agricultural product 102 from the reservoir 110 to the distribution tower 120, and may further include a meter 150 that regulates the discharge of the agricultural product 102 from the reservoir 110. As described herein, the system 100 further includes a diverter valve 200 that aids in selectively diverting agricultural product 102 to a discharge line 190 to facilitate collection of excess agricultural product 102 from within the reservoir 110.

The reservoir 110 is operable to store the agricultural product 102, and to discharge the agricultural product 102 to the distribution line 130, for example via the meter 150. The agricultural product 102 may, for example, comprise one or more of seed, pesticide, fertilizer, or another granular or pelletized form of agricultural product. In certain embodiments, the agricultural product 102 may be discharged to the distribution line 130 entirely or primarily under the force of gravity. In certain embodiments, the reservoir 110 may be connected with the blower 140 via a pressure conduit 104 such that a portion of the air discharged by the blower 140 is diverted to the reservoir 110, thereby facilitating the discharge of agricultural product 102 to the distribution line 130. The pressure conduit 104 may include a valve 105 having an open state in which a portion of the air discharged from the blower 140 is directed into the reservoir 110, and a closed state in which the blower 140 does not discharge air into the reservoir 110.

The distribution tower 120 generally includes an inlet 122 operable to receive the agricultural product 102 via the distribution valve 200, one or more outlets 124 operable to distribute the agricultural product 102, and a header 126 configured to distribute agricultural product from the inlet 122 to the one or more outlets 124. Such distribution towers are known in the art, and need not be described in further detail herein.

The distribution line 130 generally includes a manifold 132 connected with the reservoir 110 and the blower 140, and a distribution conduit 139 leading from the manifold 132 to the diverter valve 200. The manifold 132 includes a product inlet 133 that receives product 102 from the reservoir 110, an air inlet 134 that receives air discharged by the blower 140, and an outlet 135 connected with the distribution conduit 139. The manifold 132 is configured to mix the received product 102 with the air discharged by the blower 140 such that the product 102 becomes at least partially entrained in the air and flows toward the diverter valve 200 along with the flowing air. In certain embodiments, the product inlet 133 may be selectively connected with the reservoir 110 via a bypass line 106 that bypasses the meter 150. Such a bypass line 106 may include a valve 107 having an open state in which the product 102 is operable to bypass the meter 150 and a closed state in which the product 102 must pass through the meter 150 in order to enter the manifold 132.

The blower 140 is configured to discharge air via a plenum 142 at a pressure and flow rate sufficient to move the product 102 along the distribution line 130 and toward the diverter valve 200. The plenum 142 is connected with the air inlet 134 of the manifold 132 such that the blower 140 is operable to discharge air into the manifold 132. The plenum 142 may further be at least selectively connected with the reservoir 110, for example via a pressure line 104, such that the blower 140 is at least selectively operable to discharge air into the reservoir 110 along the lines set forth above.

The meter 150 is connected between the reservoir 110 and the manifold 132, and is configured to regulate the rate at which product 102 is discharged from the reservoir 110 to the manifold 132. The meter 150 may, for example, comprise a rotatable drum 152 having pockets operable to receive relatively small quantities of the product 102 from the reservoir 110. As the drum 152 rotates, the product 102 falls from the pockets into the product inlet 133 of the manifold 132. The rotational speed of the drum 152 may be variable to control the rate at which product 102 is discharged from the reservoir 110 to the manifold 130. The drum 152 may be removable such that when the drum 152 is removed, the product 102 is free to fall into the manifold 132 in an unmetered manner. In order to provide for unmetered flow, it may also be desirable to provide the meter 150 with a blank cartridge similar to the drum 152, where the blank cartridge provides for unmetered flow of product 102.

It should be appreciated that the rate of flow of product to the diverter valve 200 in the illustrated system 100 can be regulated in several manners. For metered flow, the rate at which the product 102 flows toward the valve 200 may be adjusted by regulating the operating speed of the meter 150. For unmetered flow, the rate at which the product flows toward the valve 200 may be adjusted by adjusting the degree to which the bypass valve 107 is open, thereby providing a higher or lower flow rate through the valve 107. Additionally or alternatively, the flow rate for the product 102 may be adjusted by adjusting the degree to which the pressure valve 105 is open, thereby adjusting the pressure within the reservoir 110.

Figure 4:
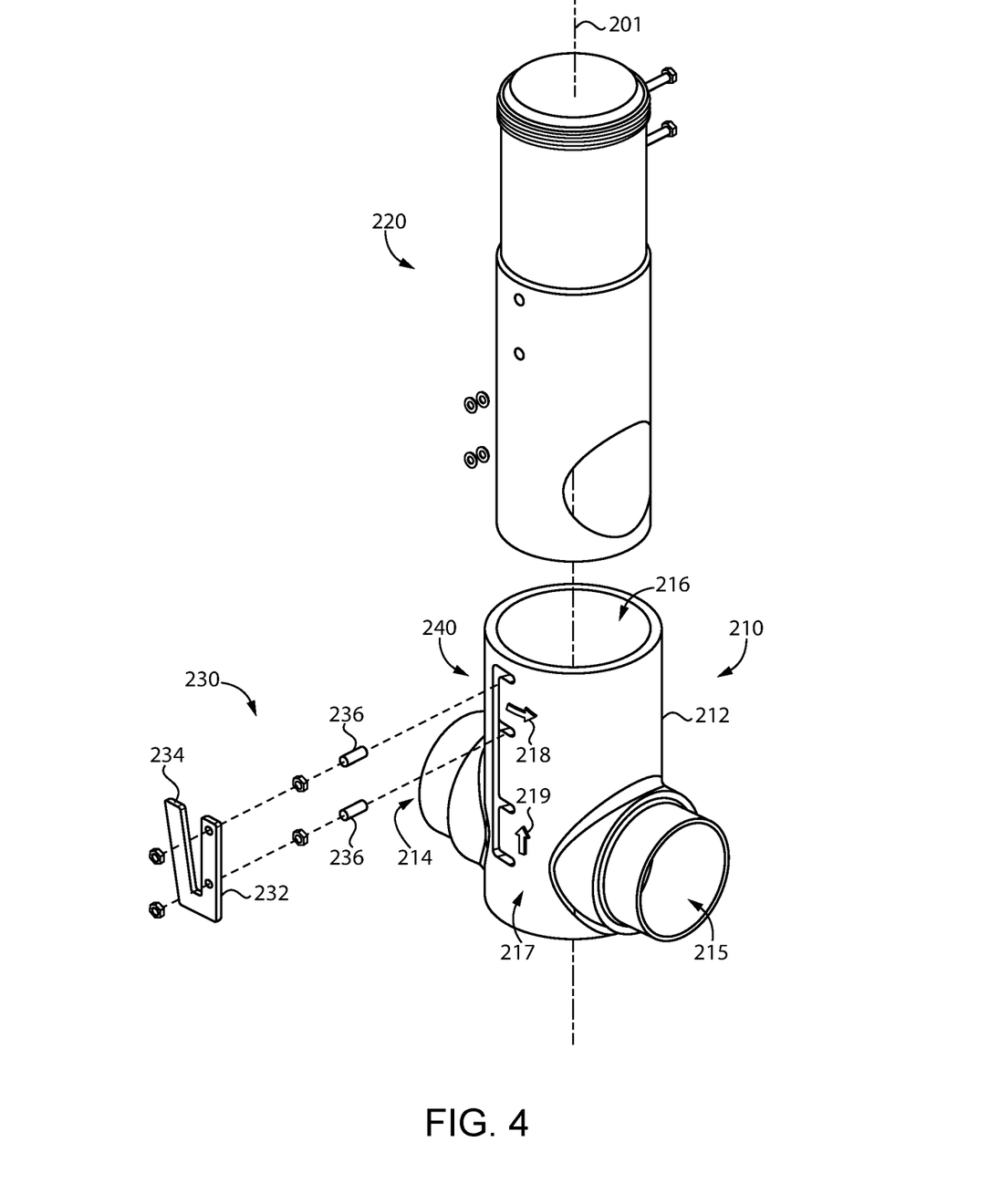
FIG. 4 is an exploded assembly view of a diverter valve according to certain embodiments.
Figure 5:
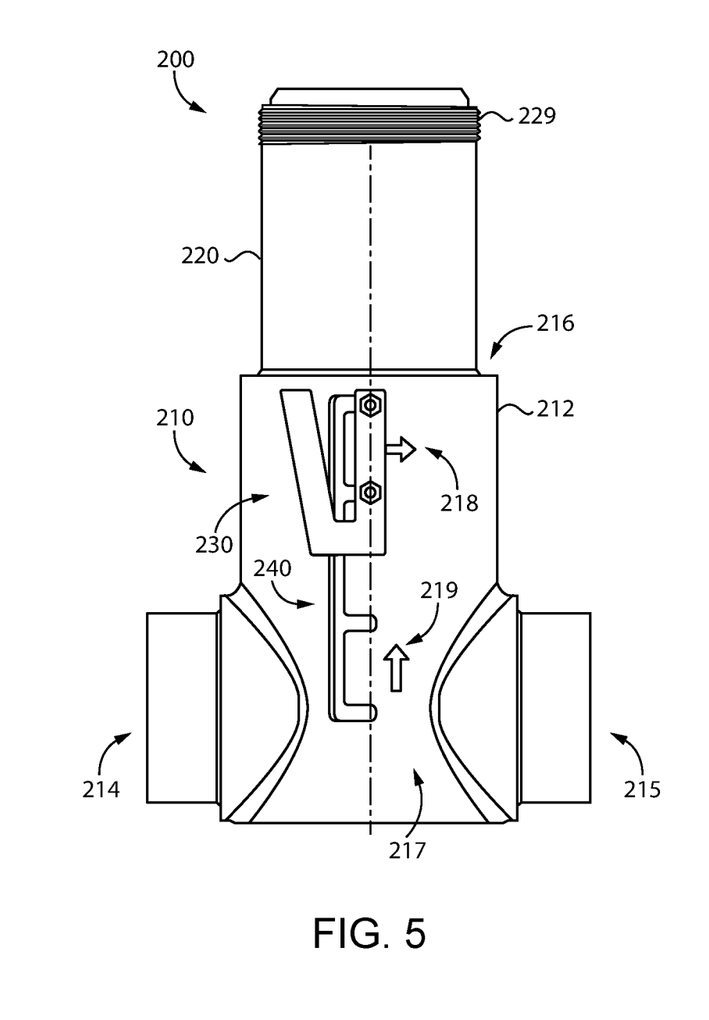
FIG. 5 is a plan view of the diverter valve illustrated in FIG. 3.

With additional reference to FIGS. 4 and 5, the diverter valve 200 generally includes a shell 210, a pipe 220 slidably mounted in the shell 210, and a handle 230 that facilitates movement of the pipe 220 relative to the shell 210 to adjust the diverter valve 200 between a first state and a second state. As described herein, the diverter valve 200 is configured to discharge product 102 to the distribution tower 120 when in a normal operating state, and to discharge product 102 to the discharge line 190 when in a discharge state.

Figure 6:
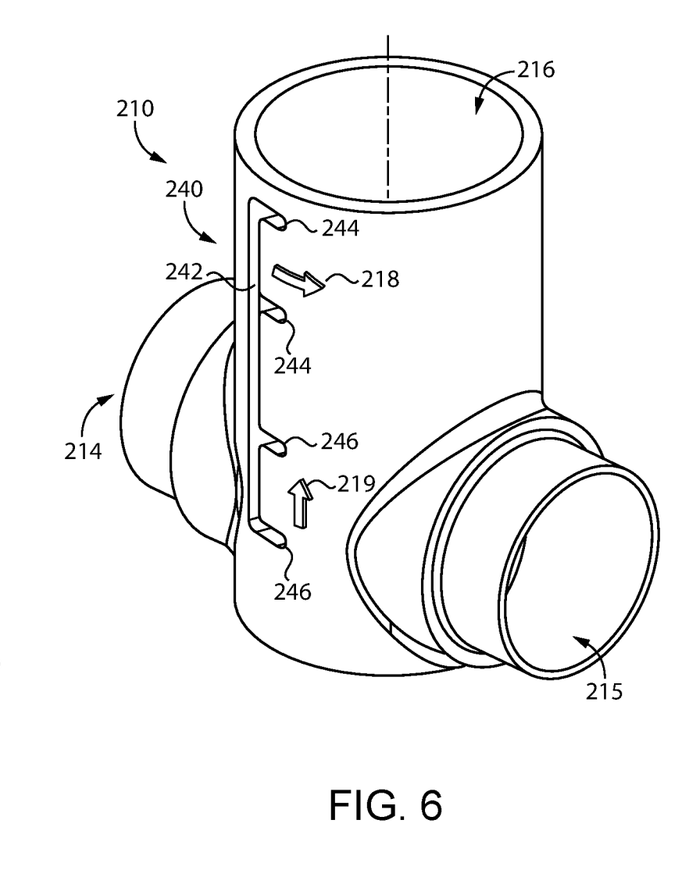
FIG. 6 is a perspective view of the diverter valve illustrated in FIG. 3.

With additional reference to FIG. 6, the shell 210 generally includes a hollow body 212 extending along a longitudinal axis 201 of the valve 200, a shell intake port 214 formed on one side of the body 212, a first shell outlet port 215 formed on an opposite side of the body 212, and a second shell outlet port 216 offset from the inlet port 214 and the first outlet port 215. The body 212 also defines a positioning slot 240, which aids in transitioning the valve 200 between its normal operating state and its discharge state as described in further detail below. The shell 210 may further include indicia 217 relating to the normal operating state and the discharge state.

Figure 7:
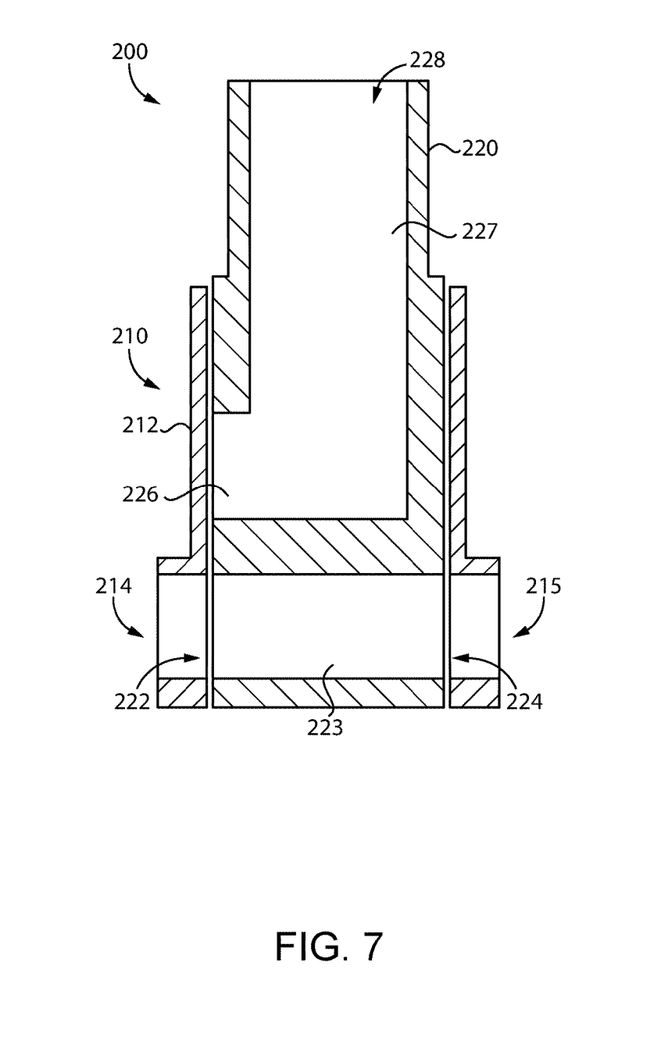
FIG. 7 is a cross-sectional view of the diverter valve in a first state.
Figure 8:
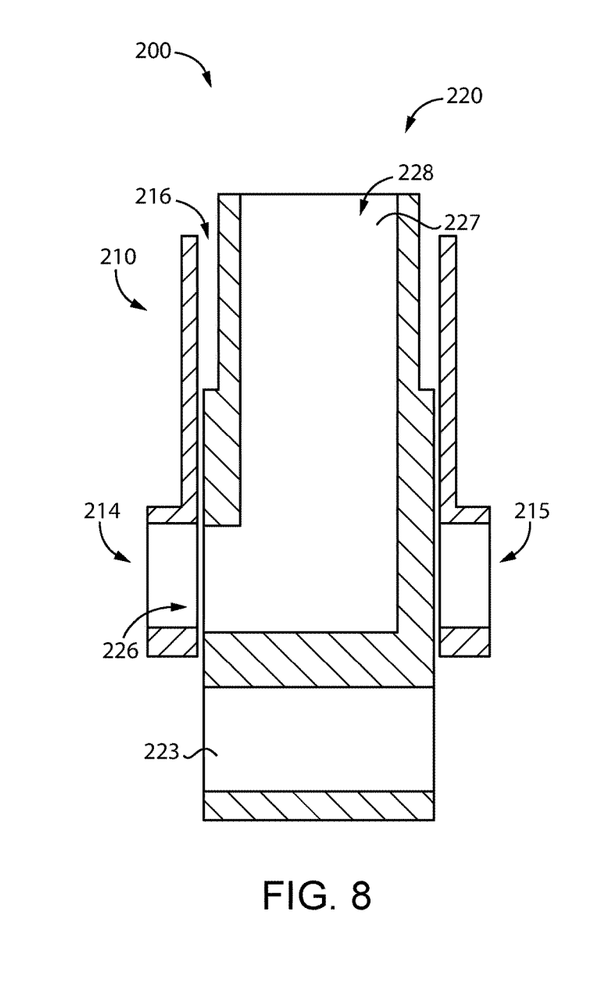
FIG. 8 is a cross-sectional view of the diverter valve in a second state.

With additional reference to FIGS. 7 and 8, the pipe 220 is slidably mounted in the body 212 of the shell 210, and generally includes a first pipe inlet 222, a first pipe outlet 224 connected with the first pipe inlet 222 via a first passage 223, a second pipe inlet 226, and a second pipe outlet 228 connected with the second pipe inlet 226 via a second passage 227. In certain forms, the first passage 223 may be considered to include the first inlet 222 and the first outlet 224, and the second passage 227 may be considered to include the second inlet 226 and the second outlet 228. The first passage 223 and the second passage 227 are isolated from one another such that product 102 entering the pipe 220 via the inlet 222/226 of one passage 223/227 exits the pipe 220 via the outlet 224/228 of the same passage 223/227. Formed about the second outlet 228 is a set of threads 229 that may, for example, be used to facilitate connection of the pipe 220 with the discharge line 190. As described herein, the pipe 220 is configured to selectively connect the shell inlet port 214 with each of the shell outlet ports 215, 216.

The handle 230 generally includes a base portion 232 and a grip portion 234 extending from the base portion 232. The base portion 232 is coupled with the pipe 220 such that a portion of the shell 210 is captured between the pipe 220 and the handle 230. For example, a pair of posts 236 or fasteners may extend through the positioning slot 240 such that the handle 230 is coupled to the pipe 220 via the posts 236. While the illustrated handle 230 includes a pair of posts 236, it is also contemplated that more or fewer posts 236 may be utilized.

The positioning slot 240 is formed in the shell 210, and generally includes a longitudinal portion 242, a first pair of retention slots 244 extending laterally from the longitudinal portion 242, and a second pair of retention slots 246 extending laterally from the longitudinal portion and offset from the first pair of retention slots 244. The first retention slots 244 are spaced apart by a distance corresponding to the distance by which the posts 236 are offset from one another such that the first retention slots 244 are operable to receive the posts 236. Similarly, the second retention slots 246 are spaced apart by a distance corresponding to the distance by which the posts 236 are offset from one another such that the second retention slots 246 are operable to receive the posts 236. Additionally, the first retention slots 244 are offset from the second retention slots 246 by a distance corresponding to the distance between the centerlines of the first pipe inlet 222 and the second pipe inlet 226. As described herein, the retention slots 244, 246 are configured to selectively retain the pipe 220 in each of a first position corresponding to the first state and a second position corresponding to the second state.

While the illustrated retention slots 244, 246 are generally perpendicular to the longitudinal portion 242, it is also contemplated that one or more of the retention slots 244, 246 may be provided at an oblique angle relative to the longitudinal portion 242. Additionally, while the illustrated retention slots 244, 246 are generally straight, it is also contemplated that one or more of the retention slots 244, 246 may include a longitudinally-extending jog operable to receive the posts 236. Furthermore, while the first retention slots 244 are formed on the same lateral side of the longitudinal portion 242 as the second retention slots 246, it is also contemplated that the first retention slots 244 may be formed on the opposite lateral side of the longitudinal portion 242 as the second retention slots 246. Moreover, while the illustrated embodiment includes two first retention slots 244 and two second retention slots 246, it is also contemplated that each set of retention slots may include more or fewer than two slots, for example in embodiments in which the handle 230 includes more or fewer than two posts 236.

When installed in the system 100, the shell inlet port 214 is connected with the distribution line 139, one of the first shell outlet port 215 or the second pipe outlet 228 is connected with the intake 122 of the distribution tower 120, and the other of the first shell outlet port 215 or the second pipe outlet 228 may be connected with the discharge line 190. In the illustrated form, the first shell outlet port 215 is connected with the distribution tower intake 122 (either directly or via a conduit), and the second pipe outlet 228 is connected with the discharge line 190. It is also contemplated that these connections may be reversed such that the second pipe outlet 228 is connected with the distribution tower intake 122 and the first shell outlet port 215 is connected with the discharge line 190.

As noted above, the shell 210 may comprise indicia 217 relating to the position of the pipe 220 and handle 230, and thus to the state of the diverter valve 200. In certain embodiments, the indicia 217 may include a first state indicium 218, and the handle 230 may be nearer to the first state indicium 218 when the handle 230 is in the first position than when the handle 230 is in the second position. The first state indicium 218 may indicate that when the handle 230 is in the first position, the valve 200 is in the first state. For example, the first state indicium 218 may comprise an arrow pointing in the direction of the first shell outlet 215 to indicate that the agricultural product 102 will flow through the first shell outlet 215 when the handle 230 is in the first position.

In certain embodiments, the indicia 217 may include a second state indicium 219, and the handle 230 may be nearer to the second state indicium 219 when the handle 230 is in the second position than when the handle 230 is in the first position. The second state indicium 218 may indicate that when the handle 230 is in the first position, the valve 200 is in the second state. For example, the second state indicium 218 may comprise an arrow pointing in the direction of the second pipe outlet 228 to indicate that the agricultural product 102 will flow through the second pipe outlet 228 when the handle 230 is in the second position.

The diverter valve 200 has a first state and a second state, each of which corresponds to a respective position of the pipe 220 relative to the shell 210. More particularly, the diverter valve 200 has a first state (FIG. 7) in which the pipe 220 is in a first position relative to the shell 210, and a second state (FIG. 8) in which the pipe 220 is in a second position relative to the shell 210. In the illustrated form, the first state (FIG. 7) is the normal operating state, in which product 102 flows to the distribution tower 120, and the second state (FIG. 8) is the discharge state, in which product 102 flows to a discharge port (e.g., via the discharge line 190). Those skilled in the art will readily appreciate, however, that should the various connections be provided in another manner, the first and second states may be reversed. For example, in embodiments in which the second pipe outlet 228 is connected with the distribution tower intake 122 and the first shell outlet port 215 is connected with the discharge line 190, the first state (FIG. 7) would be the discharge state, and the second state (FIG. 8) would be the normal operating state. Thus, while operation of the system 100 will be described with specific reference to the illustrated arrangement, it should be appreciated that other arrangements are contemplated as being within the scope of the present disclosure.

In the first state (FIG. 7), the first pipe inlet 222 is aligned with the shell inlet port 214, and the first pipe outlet 224 is aligned with the first shell outlet 215 such that the shell inlet port 214 and the first shell outlet 215 are connected via the first passage 223. As a result, product 102 flowing into the valve 200 will be directed to the component connected with the first shell outlet 215. In the illustrated form, the component connected with the first shell outlet 215 is the distribution tower 120 such that the first state is the normal operating state. In embodiments that include the first state indicium 218, the first state indicium 218 may be adjacent to the handle 230 to thereby indicate to the user that the agricultural product 102 will flow through the first shell outlet 215 and onward to the component connected with the first shell outlet (e.g., the distribution tower 120).

In the second state (FIG. 8), the second pipe inlet 226 is aligned with the shell inlet port 214. As a result, product 102 flowing into the valve 200 will be directed to the component connected with the second pipe outlet 228. In the illustrated form, the component connected with the second pipe outlet 228 is the discharge line 190 such that the second state is the discharge state. In embodiments that include the second state indicium 218, the second state indicium 218 may be adjacent to the handle 230 to thereby indicate to the user that the agricultural product 102 will flow through the second pipe outlet 228.

When the valve 200 is in its first state, the handle 230 is in its first position, in which the posts 236 are received in the first retention slots 244. Conversely, when the valve 200 is in its second state, the handle 230 is in its second position, in which the posts 236 are received in the second retention slots 246. Those skilled in the art will readily appreciate that the valve 200 may be adjusted between the first state and the second state by manipulation of the handle 230. For example, when the valve 200 is in its first state, a user may shift the handle 230 laterally such that the posts 236 enter the longitudinal portion 242 of the positioning slot 240. The handle 230 may then be shifted longitudinally until the posts 236 align with the second retention slots 246, and thereafter shifted laterally such that the posts 236 enter the second retention slots 246.

Figure 9:
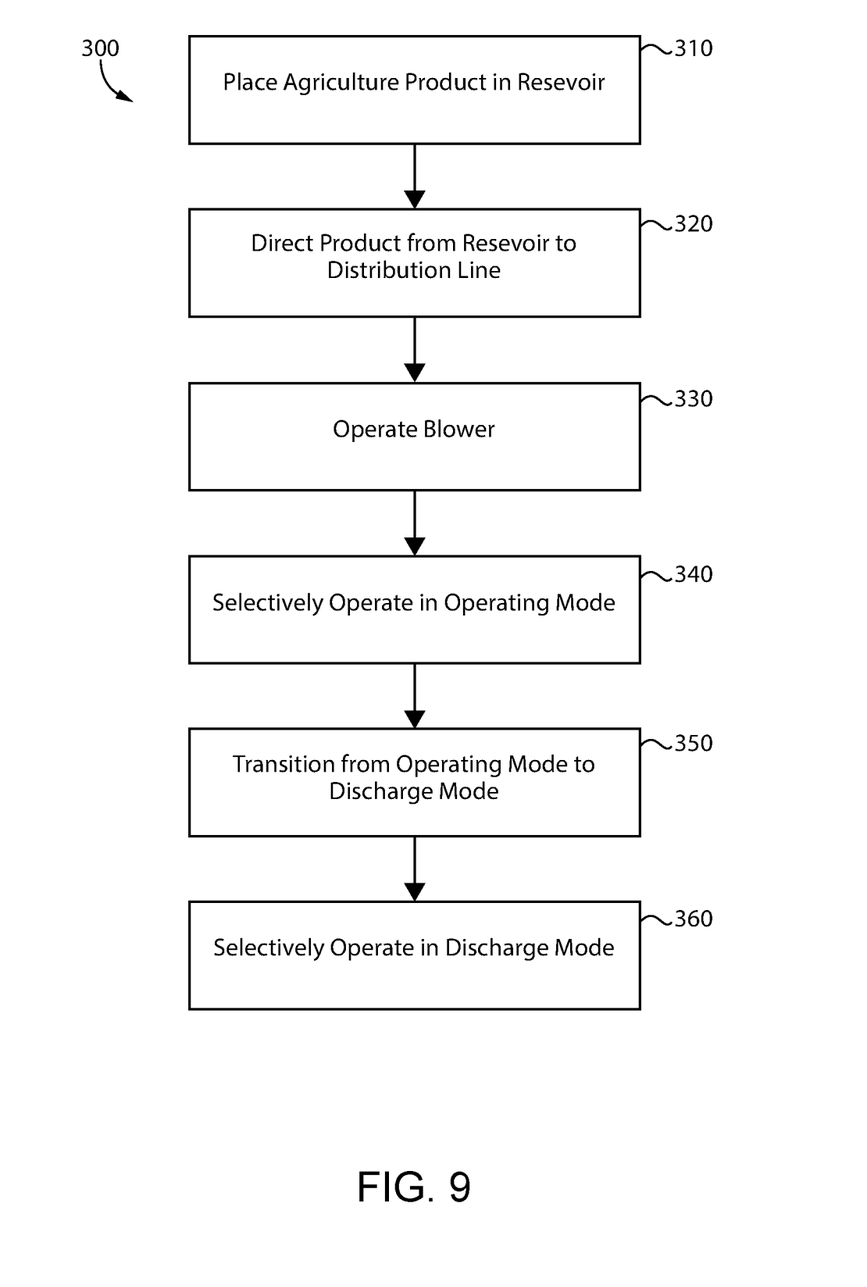
FIG. 9 is a schematic flow diagram of a process according to certain embodiments.

With additional reference to FIG. 9, an exemplary process 300 that may be performed using the air distribution system 100 is illustrated. Blocks illustrated for the processes in the present application are understood to be examples only, and blocks may be combined or divided, and added or removed, as well as re-ordered in whole or in part, unless explicitly stated to the contrary. Additionally, while the blocks are illustrated in a relatively serial fashion, it is to be understood that two or more of the blocks may be performed concurrently or in parallel with one another. Moreover, while the process 300 is described herein with specific reference to the air distribution system 100 illustrated in FIGS. 1-3 and the diverter valve 200 illustrated in FIGS. 4-8, it is to be appreciated that the process 300 may be performed with air distribution systems and/or diverter valves having additional or alternative features.

The process 300 may begin with block 310, which generally involves placing agricultural product 102 in the reservoir 110. As noted above, the agricultural product 102 may, for example, comprise one or more of seed, fertilizer, pesticide, and/or another form of granular or pelletized agricultural product.

The process 300 includes block 320, which generally involves directing agricultural product 102 from the reservoir 110 to the distribution line 130. As noted above, an intake side of the distribution line 130 is connected with the reservoir 110 and the blower 140, and an outlet side of the distribution line 130 is connected with the distribution tower 120 via the diverter valve 200. As described herein, block 320 may involve directing the product 102 from the reservoir 110 to the distribution line 130 in a metered manner (e.g., using the meter 150), or may involve directing the product 102 from the reservoir 110 to the distribution line in an unmetered manner (e.g., by removing the drum 152 and/or utilizing the bypass line 106).

The process 300 further includes block 330, which generally involves operating the blower 140 to urge the agricultural product 102 in the distribution line 130 toward the diverter valve 200. As noted above, the output of the blower 140 is sufficient to at least partially entrain the agricultural product 102 such that the agricultural product 102 flows with the air output by the blower 140 toward the diverter valve 200. In certain embodiments, the blower 140 may further be connected with the reservoir 110 to pressurize the reservoir 110 and aid in urging the product 102 in the reservoir 110 toward the product intake 133 of the distribution line manifold 132. It is also contemplated that the blower 140 may not necessarily be connected with the reservoir 110 via a pressure line 104.

The process 300 further includes block 340, which generally involves operating the system 100 in a normal operating mode. More particularly, block 340 involves operating the system 100 with the diverter valve 200 in its normal operating state. In the illustrated form, the first shell outlet port 215 is connected with the distribution tower 120 such that the first state (FIG. 7) is the normal operating state. In other embodiments, the second pipe outlet 228 may be connected with the distribution tower 120 such that the second state (FIG. 8) is the normal operating state. As should be appreciated, block 340 may further include additional operations, such as continuing to perform blocks 320 and 330. For example, in the normal operating mode of block 340, performance of block 320 may involve directing the product 102 from the reservoir 110 to the distribution line 130 in a metered manner (e.g., by operating the meter 150 to regulate the flowrate of product 102 into the manifold 132). Moreover, block 340 may involve operating the agricultural equipment 90 to which the system 100 is mounted in order to distribute the agricultural product 102 across a plot of land.

At some point, it may be the case that the normal distribution of the agricultural product 102 is no longer desired. As one example, it may be the case that a first portion of the plot of land has been provided with a first type of agricultural product 102 (e.g., a first type of seed), and a second portion of the plot of land is now to be provided with a second type of agricultural product 102 (e.g., a second type of seed). As another example, it may be the case that the plot of land has been seeded, and is now to be provided with fertilizer and/or pesticide. Regardless of the reasons, it may be desirable to empty the reservoir 110 of the remaining agricultural product 102 in a manner that facilitates collection of the product 102 for later use. In such a case, the process 300 may proceed to block 350.

Block 350 generally involves transitioning from the operating mode to the discharge mode. More particularly, block 350 involves moving the diverter valve 200 from the normal operating state to the discharge state by manipulating the handle 230 in the manner described above. It may be the case that moving the diverter valve 200 between states is more easily accomplished when product 102 is not flowing through the valve 200. In such cases, block 350 may include temporarily halting the flow of product 102 through the valve 200, for example by pausing the blower 140 and/or the meter 150. Block 350 may further involve connecting a discharge line 190 to the second pipe outlet 228 (e.g., by using the threading 229), thereby connecting the reservoir 110 with the discharge line 190 via the distribution line 130 and the diverter valve 200. In certain embodiments, block 350 may further include removing the drum 152 from the meter 150 such that the meter 150 does not restrict the flow of the product 102 from the reservoir 110 into the manifold 132. In certain forms, the drum 152 may be replaced with a blank cartridge that does not significantly inhibit flow of product 102 through the meter 150. Additionally or alternatively, block 350 may include opening the bypass valve 107 such that the product 102 is able to bypass the meter 150 via the bypass line 106.

After transitioning the system 100 from the operating mode to the discharge mode, the process 300 may continue to block 360, which generally involves selectively operating the system 100 in the discharge mode. As will be appreciated, operating the system 100 in the discharge mode of block 360 may include the performance of blocks 320 and 330. For example, performing block 320 in block 360 may involve directing the product 102 from the reservoir 110 to the distribution line 130 in an unmetered manner (e.g., by passing the product 102 through the meter 150 with the drum 152 removed and/or by passing the product 102 through the bypass line 106). It is also contemplated that performing block 320 in block 360 may involve directing the product 102 from the reservoir 110 to the distribution line 130 in a metered manner.

When operating in the discharge mode of block 360, the agricultural product 102 is directed to a discharge port of the system 100. In certain embodiments, the discharge port may simply be provided by the diverter valve 200 (e.g., as the first shell outlet port 215 or the second pipe outlet 228). In other embodiments, the discharge line 190 may be connected to the diverter valve 200 and define the discharge port. Regardless of what is considered to define the discharge port, a bin or other collection device may be placed in the vicinity of the discharge port to collect the discharged product 102 for later use. The process 300 may then begin anew by returning the system 100 to its normal operating mode and placing a new agricultural product 102 in the reservoir 110 at block 310.

As noted above, blocks of the illustrated process 300 may be reordered in whole or in part. As one example, it may be the case that it is desirable to operate in the discharge mode of block 360 prior to operating in the operating mode of block 340. For example, it may be desirable to divert the product 102 for easy collection while calibrating the meter 150 prior to distribution of the product 102. In such a case, the process 300 may involve first operating the system 100 in the discharge mode of block 360 while calibrating the meter 150, performing a transitioning similar to that of block 350 to transition the system 100 from the discharge mode to the operating mode, and subsequently operating the system 100 in the operating mode of block 340 to distribute the product 102.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected.

It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. An air distribution system for distributing an agricultural product, the air distribution system comprising:
   a reservoir that holds the agricultural product;
   a distribution tower operable to distribute the agricultural product;
   a distribution line connected between the reservoir and the distribution tower and configured to direct the agricultural product from the reservoir toward the distribution tower;
   a blower connected with the distribution line and configured to blow the agricultural product along the distribution line; and
   a diverter valve connected between the distribution line and the distribution tower, the diverter valve having an operating state in which the diverter valve directs the agricultural product toward the distribution tower, the diverter valve having a discharge state in which the diverter valve directs the agricultural product toward a discharge port different from the distribution tower.

2. The air distribution system of claim 1, wherein the blower is connected with the reservoir and is operable to pressurize the reservoir to facilitate discharge of the agricultural product toward the distribution line.

3. The air distribution system of claim 1, further comprising a meter operable to regulate flow of agricultural product to the distribution line.

4. The air distribution system of claim 3, further comprising a bypass line selectively connecting the reservoir with the distribution line, the bypass line bypassing the meter.

5. The air distribution system of claim 1, wherein the diverter valve comprises:
   an inlet connected with the distribution line;
   a first outlet connected with the distribution tower;
   a second outlet connected with the discharge port;
   a first passage connecting the inlet with the first outlet when the diverter valve is in the operating state; and
   a second passage connecting the inlet with the second outlet when the diverter valve is in the discharge state.

6. The air distribution system of claim 5, wherein the diverter valve further comprises:
   a shell defining the inlet and the first outlet;
   a pipe defining the second outlet, the first passage, and the second passage;
   wherein the pipe is movable relative to the shell to adjust the diverter valve between the operating state and the discharge state.

7. The air distribution system of claim 6, wherein the diverter valve further comprises a handle that extends through the shell and is connected with the pipe; and
   wherein the handle is operable to move the pipe relative to the shell between a first position corresponding to the operating state and a second position corresponding to the discharge state.

8. A method of operating an air distribution system comprising a reservoir, a distribution tower, a distribution line, a blower, and a diverter valve, the method comprising:
   directing agricultural product from the reservoir to the distribution line, wherein the distribution line is selectively connected to the distribution tower via the diverter valve;
   operating the blower to urge the agricultural product in the distribution line toward the diverter valve;
   selectively operating the air distribution system in an operating mode in which the diverter valve directs the agricultural product from the distribution line toward a distribution outlet of the distribution tower; and
   selectively operating the air distribution system in a discharge mode in which the diverter valve directs the agricultural product from the distribution line toward a discharge port different from the distribution outlet.

9. The method of claim 8, wherein the system further comprises a meter;
- wherein the meter regulates flow of the agricultural product from the reservoir to the distribution line when operating the air distribution system in the operating mode; and wherein the flow of the agricultural product from the reservoir to the distribution line is not regulated by the meter when operating the air distribution system in the discharge mode.

10. The method of claim 9, wherein operating the air distribution system in the discharge mode comprises directing the agricultural product from the reservoir to the distribution line via a bypass line that bypasses the meter.

11. The method of claim 8, wherein the diverter valve is connected to a discharge line comprising the discharge port.

12. The method of claim 8, further comprising transitioning between the operating mode and the discharge mode, wherein the transitioning comprises moving a handle of the diverter valve in a linear direction to adjust the diverter valve between a first state in which the diverter valve directs the agricultural product from the distribution line toward the distribution outlet and a second state in which the diverter valve directs the agricultural product from the distribution line toward the discharge port.

13. The method of claim 8, wherein the blower is connected with the reservoir via a pressure line; and wherein the method further comprises adjusting an air flow of air through the pressure line to thereby adjust a product flow of product from the reservoir to the distribution line.

14. The method of claim 8, wherein the diverter valve comprises:

a shell comprising an inlet port connected with the distribution line and an outlet port connected with the distribution tower; and a pipe movably mounted in the shell, the pipe defining a first passage and a second passage;

wherein the second passage is connected with the discharge port;

wherein, in the operating mode, the first passage connects the inlet port with the outlet port such that the distribution line is connected with the distribution tower; and wherein, in the discharge mode, the second passage is connected to the inlet port such that the distribution line is connected with the discharge port.

15. The method of claim 14, wherein the shell of the diverter valve further comprises a body and a positioning slot formed in the body; and the diverter valve further comprises a handle connected to the pipe through the positioning slot, wherein the handle is operable to move the pipe relative to the shell;

wherein the step of selectively operating the air distribution system in an operating mode by moving the diverter valve to a normal operating state comprises using the handle to move the pipe to a first position in which the shell inlet port is connected with the shell outlet port via the first passage; and wherein the step of selectively operating the air distribution system in a discharge mode by moving the diverter valve to a discharge state comprises using the handle to move the pipe to a second position in which the second passage is connected with the shell inlet port and the shell outlet port is disconnected from the second passage.

16. The method of claim 15, wherein the first position and the second position are longitudinally offset from one another.

17. The method of claim 15, wherein the handle is connected with the pipe via a post that extends through the positioning slot; and wherein the positioning slot comprises:

a first retention slot in which the post is received when the pipe is in the first position;

a second retention slot in which the post is received when the pipe is in the second position, wherein the second retention slot is offset from the first retention slot;

a connecting portion connecting the first retention slot and the second retention slot; and wherein the step of selectively operating the air distribution system in an operating mode by moving the diverter valve to a normal operating state comprises moving the handle to position the post in the first retention slot; and wherein the step of selectively operating the air distribution system in a discharge mode by moving the diverter valve to a discharge state comprises moving the handle to position the post in the second retention slot.

18. The method of claim 17, wherein the connecting portion extends in the longitudinal direction, and wherein each of the first retention slot and the second retention slot extends laterally from the connecting portion.

19. The method of claim 15, wherein the shell further comprises a first indicium and a second indicium;

wherein the handle is nearer the first indicium than the second indicium when the pipe is in the first position; and wherein the handle is nearer the second indicium than the first indicium when the pipe is in the second position.

20. The method of claim 19, wherein the first indicium indicates that the shell inlet port is connected with the shell outlet port; and wherein the second indicium indicates that the shell inlet port is connected with an outlet of the second passage.

21. The method of claim 15, wherein the first passage comprises a first pipe inlet and a first pipe outlet;

wherein the second passage comprises a second pipe inlet and a second pipe outlet; and wherein the pipe further comprises threading formed about the second pipe outlet.

* * * * *